Aug. 23, 1932.   V. KUTNAR   1,873,651
AEROPLANE
Filed Sept. 2, 1931   4 Sheets-Sheet 2
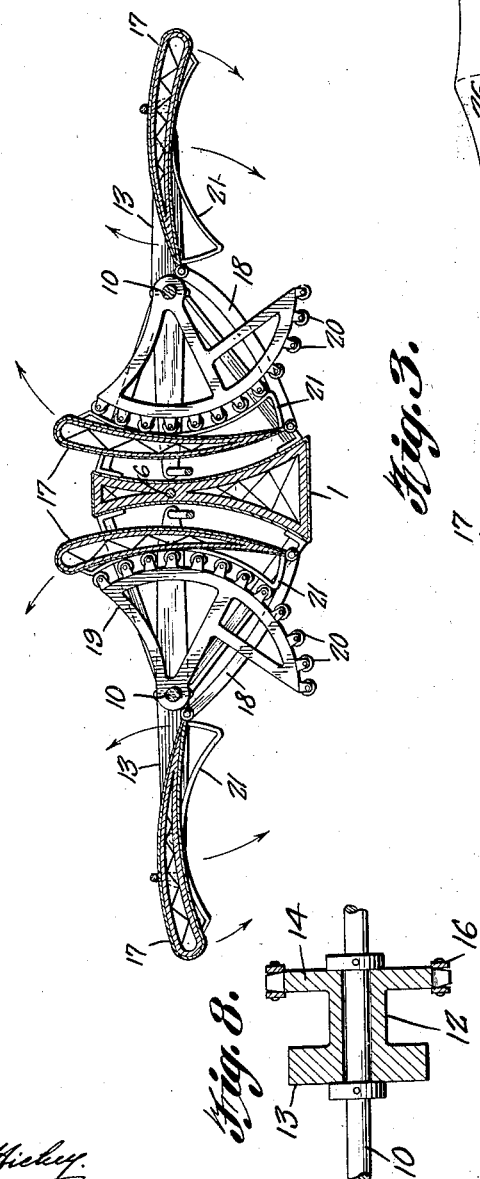
Virgil Kutnar,
INVENTOR
BY Victor J. Evans
and Co. ATTORNEYS
WITNESS:

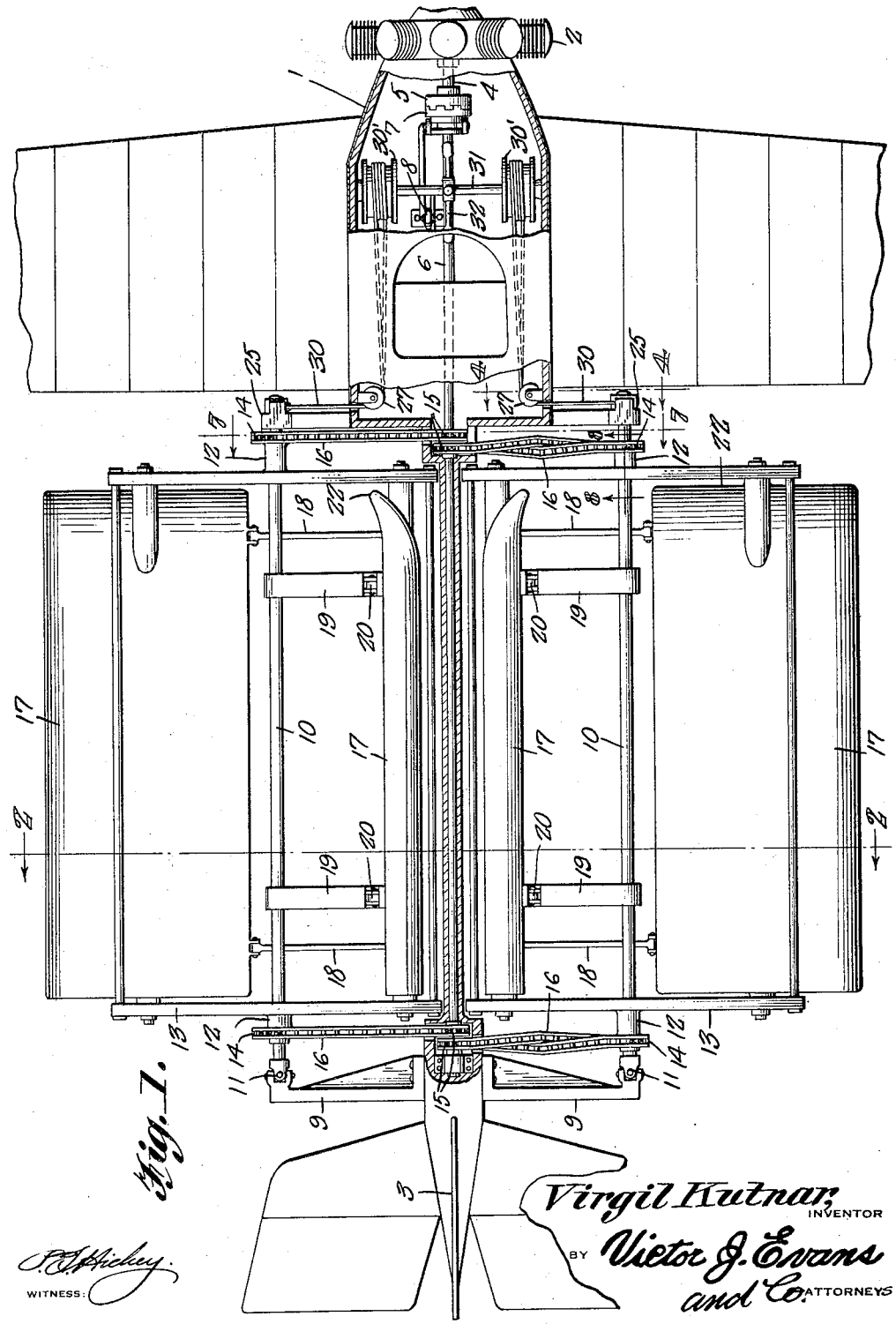

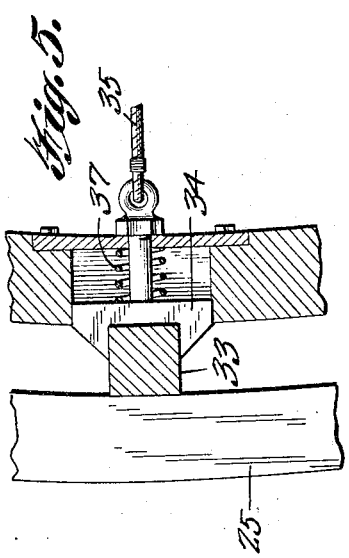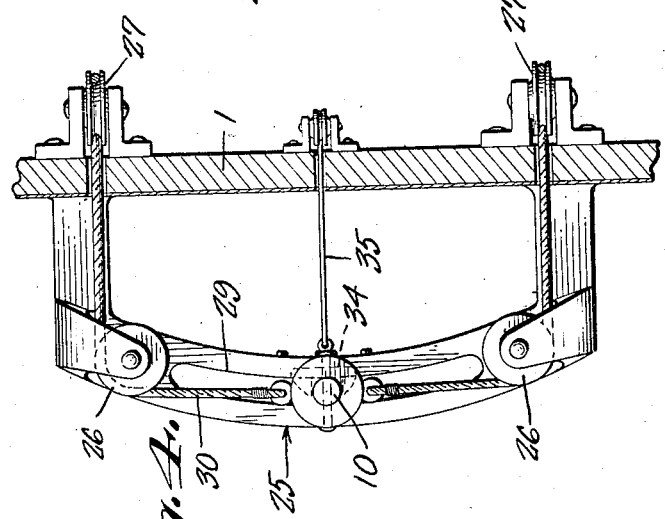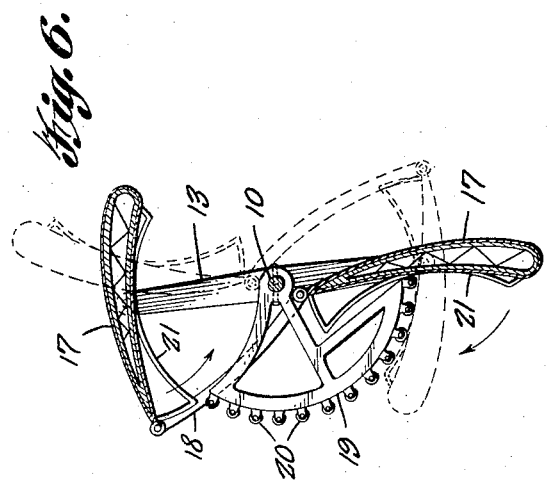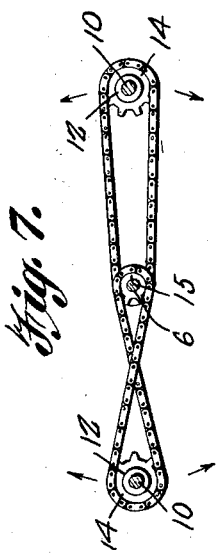

Aug. 23, 1932. V. KUTNAR 1,873,651
AEROPLANE
Filed Sept. 2, 1931 4 Sheets-Sheet 4
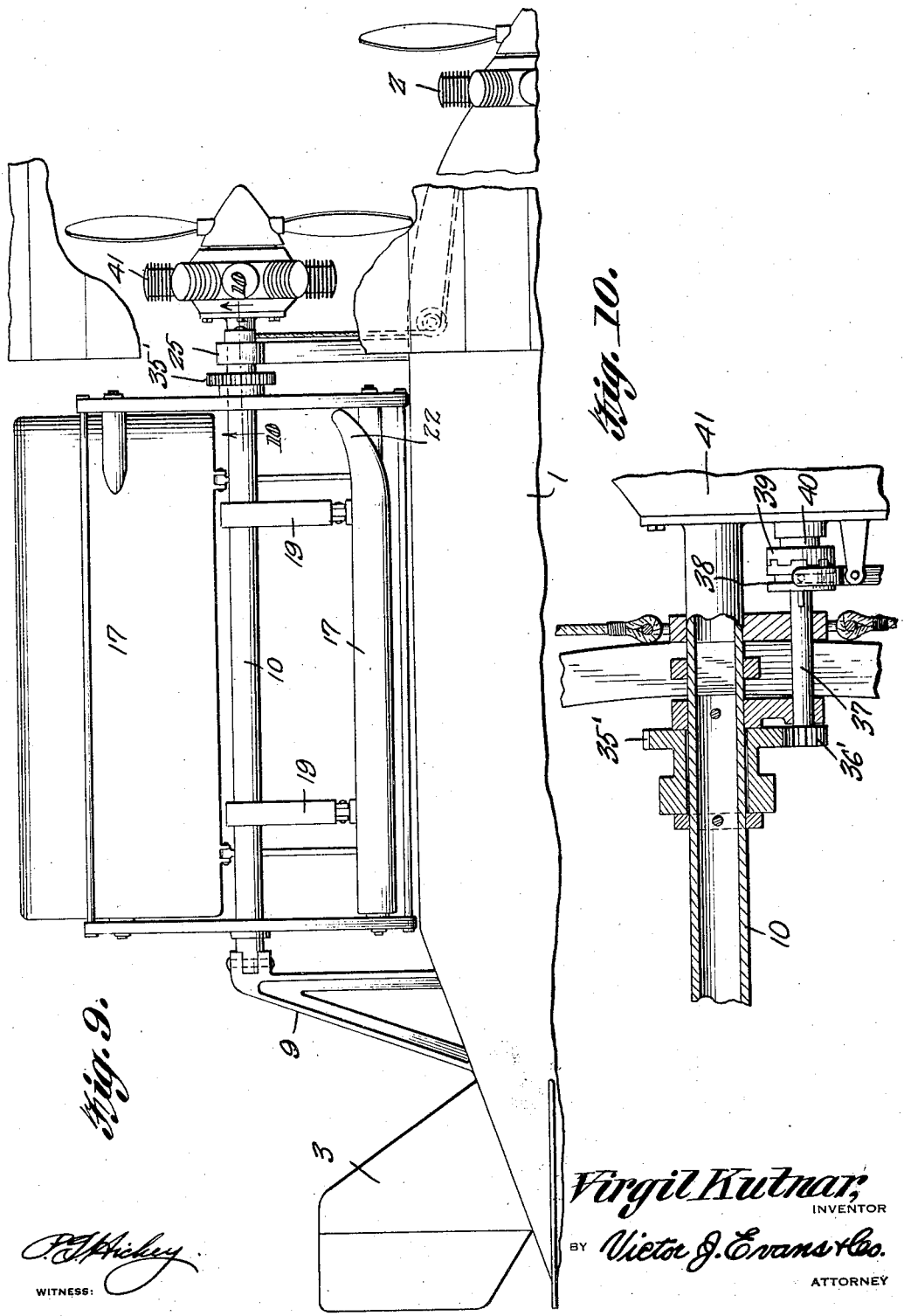
Virgil Kutnar, INVENTOR
BY Victor J. Evans & Co.
ATTORNEY Patented Aug. 23, 1932

1,873,651

UNITED STATES PATENT OFFICE

VIRGIL KUTNAR, OF GREELEY, COLORADO

AEROPLANE

Application filed September 2, 1931. Serial No. 560,838.

This invention relates to aeroplanes, and it consists in the novel features hereinafter described and claimed.

An object of the invention is to provide wing means for an aeroplane machine which may be operated to cause the machine to rise vertically while the body thereof is in a horizontal position and conversely to permit the machine to gravitate vertically while the body is in a horizontal position.

With this object in view, the structure includes frames which are journaled upon the body of the machine at the opposite sides of the median line of the body, means being provided for simultaneously rotating the frames in opposite directions. A set of wings is pivotally mounted upon each frame and means are provided for connecting the wings together so that as one wing upon each frame moves to a closed position the other wing moves to an open position. The closed wing operates in a downward direction upon a column of air and causes the machine to rise vertically and the open wing permits the air to pass through the frame so that there is no back pressure upon the frame or the lifting wing. Means are provided for raising and lowering the forward ends of the frames to facilitate the lifting action and the forward ends of the wings are downwardly curved in order that the wings may effectually operate upon the air.

In the accompanying drawings:—

Figure 1 is a top plan view of a flying machine with parts in section showing the lifting wings applied thereto.

Figure 2 is a transverse sectional view cut on the line 2—2 of Figure 1.

Figure 3 is a side elevational view of the intermediate portions of the flying machine.

Figure 4 is a detailed sectional view cut on the line 4—4 of Figure 1.

Figure 5 is a detailed horizontal view cut on the line 5—5 of Figure 3.

Figure 6 is a transverse sectional view cut on the line 6—6 of Figure 1.

Figure 7 is a sectional view cut on the line 7—7 of Figure 1.

Figure 8 is a detailed sectional view cut on the line 8—8 of Figure 1.

Figure 9 is a side elevational view of a modified form of the lifting means.

Figure 10 is a detailed sectional view cut on the line 10—10 of Figure 9.

In the form of the engine as illustrated in Figures 1 to 8 inclusive, the aeroplane consists of a body or fuselage 1 of usual form having engine 2 at its forward end and rudder 3 at its rear. The engine shaft 4 is provided with a clutch member 5 and a shaft 6 extending along the median longitudinal line of the body 1 is aligned with the engine shaft 4. A clutch member 7 is slidable upon the shaft 6 and may be moved into mesh with the clutch member 5 by using a lever mechanism 8 and connecting parts in a usual manner. A bracket, or brackets, 9 is disposed transversely with relation to the rear end of the body 1 and located in advance of the rudder 3. Shafts 10 are connected by means of universal joints 11 with the ends of the bracket 9. Sleeves 12 are journaled upon the shafts 10 and carry rectangular frames 13. Sprocket wheels 14 are fixed to the ends of the sleeves 12 and sprocket wheels 15 are fixed to the shaft 6. Sprocket chains 16 are trained around the sprocket wheels 14 and 15 and the chains 16 at one side of the shaft 6 are crossed so that as the shaft 6 rotates rotary movement is transmitted through the chains to the frames 13 so that the said frames rotate simultaneously in opposite directions. When the clutch member 7 is engaged with the clutch member 5 and the engine 2 is in operation the shaft 6 rotates with the shaft 4.

Upon each of the frames 13 is pivotally mounted a pair of wings 17 and the said wings are disposed parallel with the median longitudinal dimension of the body 1. The wings 17 extend throughout the major portion of the length of the body. The wings 17 of each pair are connected together by means of links 18 so that the said wings are at all times substantially held at right angles with relation to each other and that is to say, as will be hereinafter explained, that as the wings move in a downward direction they cross with relation to the frame, and as they move in an upward direction they open with relation to the frame. The shafts 10 do not rotate and cam members 19 are fixed upon the said shafts. The cam members 19 are provided upon their edges with series of friction rollers 20. The wings 17 are provided at their inner sides with guard rails 21 which travel upon the rollers 20 and cause the wings to turn upon their pivots as hereinbefore described, and during the rotation of the frames. Thus as the wings move in a downward direction, they exert pressure upon the air in a vertical direction which has a tendency to lift the aeroplane vertically and as the wings move in an upward direction they are turned edgewise so that they cleave the air and thus as the wings move in an upward direction they do not cause resistance upon the aeroplane in its vertical movement. The forward ends of the wings 17 are curved as at 22 and the said curved ends of the wings are downwardly disposed as the wings move in a downward direction and the said curvature causes the forward ends of the wings to bite or impinge upon the air as they move downwardly.

Brackets 25 are mounted at the sides of the forward portion of the body 1 and the said brackets are provided at their upper and lower ends with pulleys 26. Pulleys 27 are journaled within the body 1. Collars 28 are carried at the forward ends of the shafts 10 and the said shafts pass through openings 29 in the brackets 25. Cables 30 are connected with the collar 28 and trained around the pulleys 26 and 27 and arranged to wind upon drums 30′ mounted upon a shaft 31 journaled in the forward portion of the body 1. A winding wheel 32 is fixed to the shaft 31. A block 33 is connected with the collar 28 and a latch bolt 34 is slidably mounted in each bracket 25. Cables 35 are connected with the latch bolts 34 and with a foot treadle 36 pivoted in the forward part of the body 1. Springs 37 hold the latch bolts 34 toward the blocks 33 and when the blocks are received within the ends of the bolts 34 the shafts 10 are held at stationary positions. Should it be desired to raise or lower the forward ends of the shafts 10 in order to give the blades 17 desired pitch with relation to a horizontal line the operator uses his foot upon the treadle 36 and moves the cables 35 whereby the latch bolts 34 are withdrawn from the blocks 33 and then by turning the hand-wheel 32, the cables may be wound upon or unwound from the drums 30 and thus the collars 28 and the forward ends of the shafts 10 may be raised or lowered. This movement changes the position of the forward ends of the frames and the forward ends of the wings 17 are correspondingly moved.

In the form of the engine as illustrated in Figures 9 and 10 the same general arrangement is observed except that the sprocket wheels 14 as hereinbefore described are substituted by gear-wheels 35′ which mesh with gear-wheels 36′ mounted upon shafts 37 having clutch members 38 slidable thereon adapted to engage clutch members 39 which in turn are mounted upon stub shafts 40 operatively connected with the shafts of engines 41 which are located in advance of the shafts 10. The forward ends of the shafts 10 are attached to the casings of the engines 41.

This invention comprises a new type of wings for an aeroplane and is a type of aircraft which is free of the aeroplane's complete dependence upon high speed for take off, support in the air, and landing; hence immune to serious consequences from the propeller motor failure, or from loss of headway through whatever cause, and freedom from the aeroplane's requirements of huge prepared landing fields.

Landing fields will not be needed as the plane will rise vertically in the air and land on a space of its own size.

A plane so equipped will climb vertically in the air faster than any ordinary plane with fixed wings only, and double its cruising speed, as the wings have a forward pull themselves by regulating the wings' angle.

The plane is able to rise vertically in the air with a load many times its own weight, and may remain stationary in the air, descend slowly, and its immunity to dive or spin or other critical situations, easy of control and maneuverability and anyone may be able to fly the plane without much practical training.

The movements of the plane are independent of the speed of the craft itself; the speed of the wings' rotation is practically constant whether the plane is traveling fast or slow, hovering or descending, and will not be effected even by the propeller motor failure.

The wings 17 are freely pivoted upon the frames 13 with the exception that the pivotal movement of one wing upon one frame controls the pivotal movement of the other wing upon the same frame. The pivots of the wings are located in advance of the centers of pressure whereby the wings move substantially edgewise and horizontally in outward directions over their pivots away from the body, swing outwardly at their inner edges while descending and move edgewise vertically at the sides of the body while ascending.

This plane can be operated by extra motors or by taking the power from the propeller motor by extending the motor shaft back through the fuselage and operated from the pilot's cabin.

By using an extra motor on each wing frame and additional propellers can be installed to still further increase the plane's speed.

The wings are secured to the fuselage with universal joints so they can be adjusted with cables from the pilot's cabin to any desired angle for rising vertically in the air or still further increase the flying speed, or to use the wings only for rising vertically in the air and landing.

Having described the invention, what is claimed is:—

1. An aeroplane comprising a body, frames journaled thereon at opposite sides of the median line of the body, means for simultaneously rotating the frames in opposite directions, a pair of wings freely pivoted upon each frame, means operatively connecting the wings together whereby the pivotal movement of one wing controls the pivotal movement of the other wing upon the same frame, the pivots of the wings located in advance of the centers of pressure and the arrangement being such that the wings move substantially edgewise and horizontally in outward directions over their pivots away from the body, swing outwardly at their inner edges while descending and move edgewise vertically at the sides of the body when ascending.

2. An aeroplane comprising a body, frames journaled thereon at the opposite sides of the median line of the body, means for simultaneously rotating the frames in opposite directions, a pair of wings freely pivoted upon each frame, means operatively connecting the wings together whereby the pivotal movement of one wing controls the pivotal movement of the other wing upon the same frame, the pivots of the wings located in advance of the centers of pressure and the arrangement being such that the wings move substantially edgewise and horizontally in outward directions over their pivots away from the body, swing outwardly at their inner edges while descending and move edgewise vertically at the sides of the body when ascending, and said wings having forward ends downwardly curved.

3. An aeroplane comprising a body, frames journaled thereon at opposite sides of the median line of the body, means for simultaneously rotating the frames in opposite directions, a pair of wings freely pivoted upon each frame, means operatively connecting the wings together whereby the pivotal movement of one wing controls the pivotal movement of the other wing upon the same frame, the pivots of the wings located in advance of the centers of pressure and the arrangement being such that the wings move substantially edgewise and horizontally in outward directions over their pivots away from the body, swing outwardly at their inner edges while descending and move edgewise vertically at the sides of the body when ascending, and arms fixed with relation to the body and contacted by the wings successively for pivotally moving the wings.

4. An aeroplane comprising a body, frames journaled thereon at opposite sides of the median line of the body, means for simultaneously rotating the frames in opposite directions, a pair of wings freely pivoted upon each frame, means operatively connecting the wings together whereby the pivotal movement of one wing controls the pivotal movement of the other wing upon the same frame, the pivots of the wings located in advance of the centers of pressure and the arrangement being such that the wings move substantially edgewise and horizontally in outward directions over their pivots away from the body, swing outwardly at their inner edges while descending and move edgewise vertically at the sides of the body when ascending, arms fixed with relation to the body and contacted by the wings successively for pivotally moving the wings, said wings having guard members mounted thereon and adapted to contact the peripheries of the cams.

In testimony whereof I affix my signature.

VIRGIL KUTNAR.